United States Patent [19]
Geis

[11] 3,825,139
[45] July 23, 1974

[54] MEANS FOR LOCKING FORKLIFT TRUCK FORKS IN STORED POSITION

[75] Inventor: Warren P. Geis, Port Washington, Wis.

[73] Assignee: Koehring Company, Milwaukee, Wis.

[22] Filed: June 11, 1973

[21] Appl. No.: 368,817

[52] U.S. Cl. .............................. 214/731, 214/750
[51] Int. Cl. ................................................ B66f 9/14
[58] Field of Search ........... 214/103, 104, 105, 106, 214/107, 108, 109, 620, 621, 651, 652, 700, 704, 706, 730, 731, 750, 131, 140, 768, 149

[56] References Cited
UNITED STATES PATENTS

| | | | |
|---|---|---|---|
| 2,596,747 | 5/1952 | Ward et al. | 214/750 |
| 2,862,628 | 12/1958 | Coates et al. | 214/75 H |
| 3,032,220 | 5/1962 | Love | 214/620 |

FOREIGN PATENTS OR APPLICATIONS

| | | | |
|---|---|---|---|
| 1,061,167 | 3/1967 | Great Britain | 214/750 |

*Primary Examiner*—Robert J. Spar
*Assistant Examiner*—Lawrence J. Oresky
*Attorney, Agent, or Firm*—Andrew J. Beck

[57] ABSTRACT

A forklift truck comprises an upright mast on which a vertically movable carriage or grill is mounted. A pair of load handling forks are mounted on a horizontally disposed shaft on the grill. Each fork is laterally slidable on the shaft to achieve desired spacing between the forks. Each fork is also vertically pivotable between an in-use position wherein the fork tine extends outwardly of the truck and a stored position wherein the fork tine extends inwardly of the truck and adjacent a side of the mast. Locking means are provided to maintain the forks in stored position and to prevent lateral displacement of the forks on the shaft while stored. The locking means for each fork comprise a generally L-shaped locking bracket which is pivotably attached to the grill and swingable horizontally from a stored position clear of the fork to a locking position in engagement with the fork. The locking means for each fork further comprise pin means releasably engageable with the bracket and the grill to maintain the bracket in stored or locking position. In one embodiment of the invention the locking bracket is positioned so as to entrap the fork against a side of the mast to prevent lateral movement of the stored fork on its shaft. In another embodiment of the invention the locking bracket is provided with a projection engageable with the fork to prevent lateral movement of the stored fork.

15 Claims, 8 Drawing Figures

MEANS FOR LOCKING FORKLIFT TRUCK FORKS IN STORED POSITION

BACKGROUND OF THE INVENTION

1. Field of Use

This invention relates generally to forklift trucks having swingable and slidably movable forks and, particularly, to means for locking the forks thereof in a stored position.

2. Description of the Prior Art

Some forklift trucks are provided with a mast at one end on which a vertically movable carriage or grill is mounted. The grill is provided with a horizontally disposed shaft on which a pair of forks are mounted. Typically, the forks are free to be slidably moved on the shaft to achieve desired spacing between them to suit a particular job. Furthermore, the forks are swingable upwardly from an in-use position wherein they project outwardly from the end of the truck to a raised or stored position wherein the forks extend upwardly and inwardly of the truck. It is common practice to transport such forklift trucks to a jobsite on the bed of a conventional truck or a trailer. When doing so, it is desirable from the standpoint of convenience and safety, to swing the forks into stored position and to temporarily secure them in this position. Such storage not only enables use of a vehicle having a smaller bed but facilitates driving the forklift truck onto and off of the vehicle bed, especially when steep ramps are involved. Storage of the forks also reduces the hazard of operating personnel being struck by projecting forks. Heretofore, prior art forklift trucks of the aforesaid character were not provided with integral means for securing the forks in a raised or stored position and for preventing their lateral displacement while in that position. Therefore, there existed a hazard that the forks would fall downward to in-use position or shift sideways, or both, during transport or during loading or unloading. It is desirable, therefore, to provide means for locking forklift truck forks in stored position and to prevent their lateral displacement while in that position. U.S. Pat. No. 3,458,069 issued July 29, 1969 to Wickberg et al. shows a combined scoop bucket and forks wherein the forks are upwardly swingable to an out of the way position when not in use. However, these forks are not mast-mounted and are not laterally shiftable.

SUMMARY OF THE PRESENT INVENTION

In accordance with the invention, a forklift truck comprises a grill which is mounted for vertical movement on a mast at an end of the truck. The grill supports a horizontally disposed pivot shaft on which a pair of spaced apart L-shaped forks are pivotably and slidably mounted. Each fork has an in-use position wherein it depends vertically from the pivot shaft and the fork tine or tip extends horizontally from the end of the truck. Each fork is pivotable upwardly in excess of 90° about the shaft to a stored position wherein the fork shank abuts a cross-brace at the top of the grill and the fork tine extends at any angle upwardly and inwardly toward the lift truck. Each fork is laterally slidable on the shaft. Locking means are provided to lock the forks in stored position and to prevent lateral movement of the forks while in stored position. The locking means for each fork comprise an L-shaped bracket which is pivotally connected at its shank end by a bolt to the cross bracing member at the top of the grill and is swingable forwardly in a horizontal plane from a stored position clear of its fork (wherein it is maintained by a removable locking pin) to a locking position (wherein it is maintained by the locking pin) wherein it engages the under or rear side of the fork shank and holds the front side of the fork shank against the front edge of the top cross bracing member of the grill to prevent further pivotal movement of the fork in either direction. The shank of the bracket is provided with a hole for accommodating the locking pin. The top bracing member of the grill is provided with two spaced apart holes, one for receiving the locking pin when the bracket is in stored position and the other for receiving the locking pin when the bracket is swung to locking position. In one embodiment of the invention the shank of the bracket holds the fork against the outer side of the mast, thereby preventing sliding movement of the fork on its shaft when stored. In another embodiment, the end portion of the bracket is provided with a projection for engaging a side of the fork to prevent lateral displacement.

Locking means in accordance with the invention are economical and simple to fabricate, installable during manufacture or in the field, reliable in use, and foolproof. Other objects and advantages of the invention will hereinafter appear.

DRAWINGS

DESCRIPTION OF PREFERRED EMBODIMENTS

Figure 1:
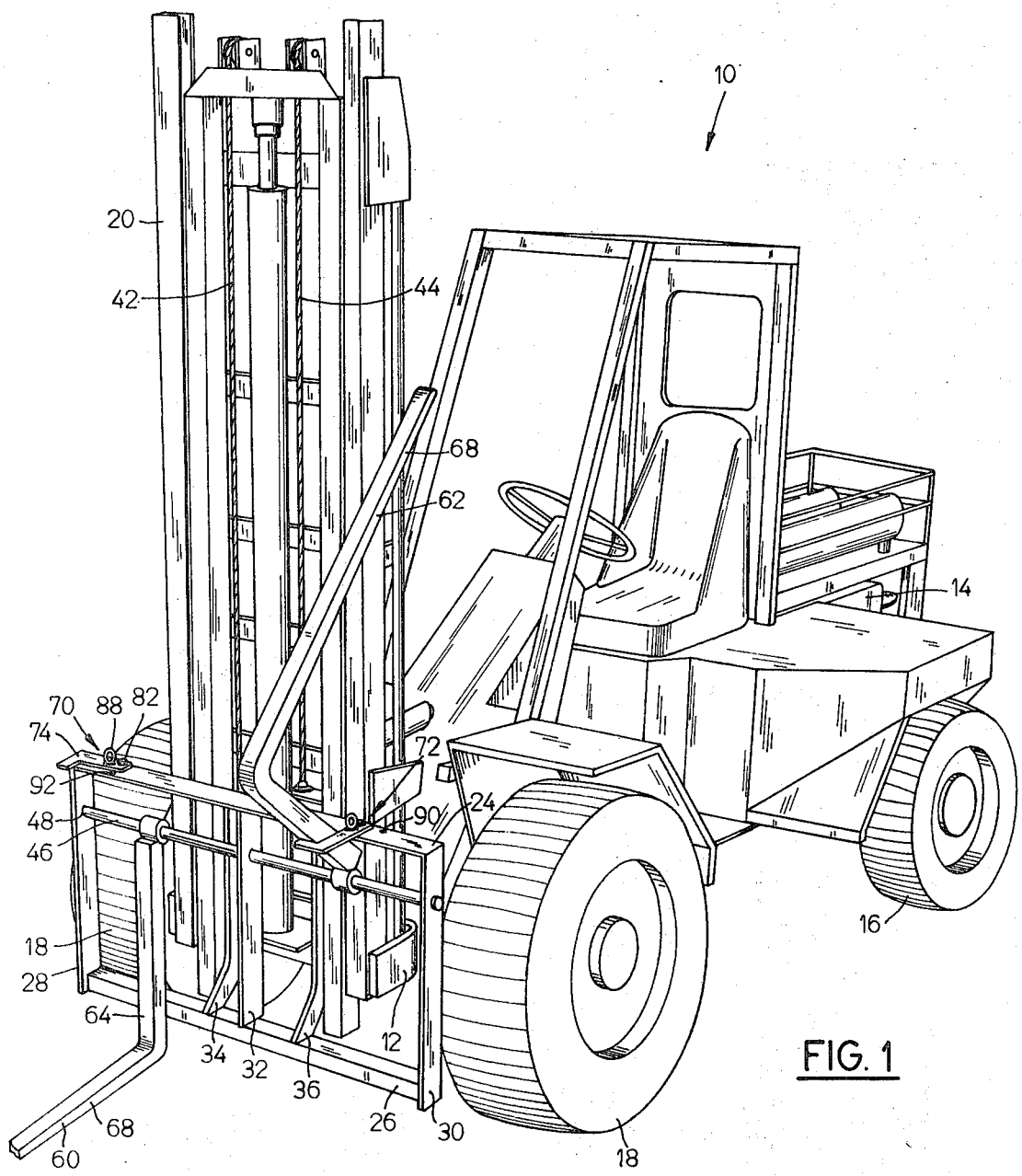
FIG. 1 is a perspective view of a forklift truck employing tine storage and locking means in accordance with the invention, taken generally from the left front side of the truck.

Referring to FIG. 1, the numeral 10 designates a forklift truck employing tine storage and locking means in accordance with the present invention. Truck 10 comprises a chassis 12 on which an engine 14 is mounted and which is provided with a pair of steerable rubber-tired rear wheels 16 and a pair of non-steerable rubber-tired engine driven front wheels 18. A three-stage upright telescopic mast 20, shown in fully telescoped or lowered position, is mounted on chassis 12 at the front end of truck 10. A vertically movable rectangularly shaped grill 22, shown in fully lowered position, is mounted on mast 20.

Figure 2:
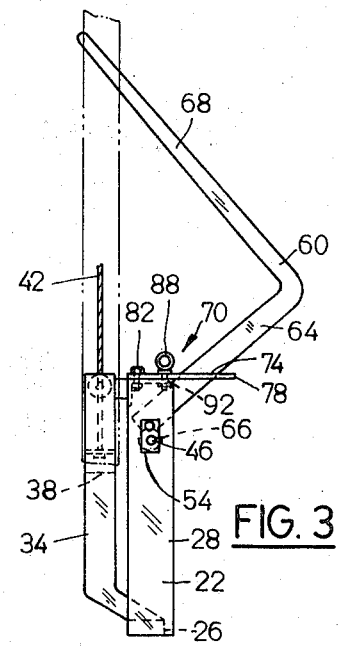
FIG. 2 is a front elevational view of the vertically movable grill shown in FIG. 1.
Figure 3:
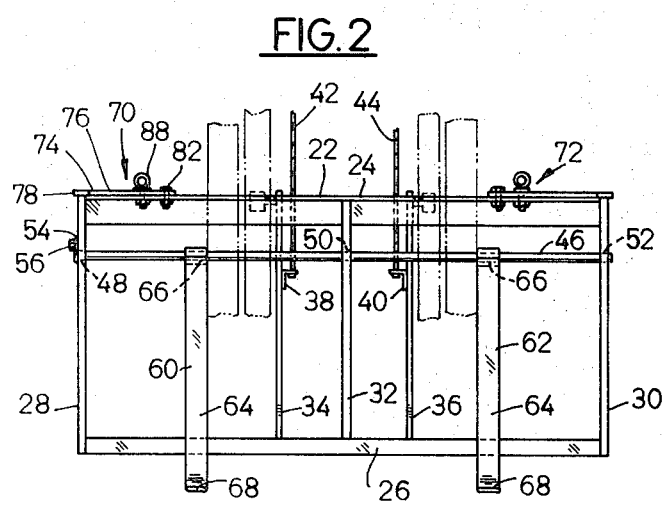
FIG. 3 is a side elevational view of the grill shown in FIGS. 1 and 2 and showing the forks locked in raised stored position.

As FIGS. 1 and 2 show, grill 22 comprises a rigid horizontally disposed top bracing member 24 in the form of a length of angle iron, a rigid horizontally disposed bottom bracing member 26 in the form of a box girder, and rigid vertically disposed bracing or right and left end members 28 and 30, respectively, in the form of bar stock, which are welded to the top and bottom bracing members. A rigid vertically disposed center support member 32 is welded between the top and bottom bracing members 24 and 26, respectively. Grill 22 is connected to mast 20 by means of a pair of spaced apart rearwardly offset support members 34 and 36 which are welded between the top and bottom bracing members 24 and 26, respectively. The support members 34 and 36 are provided with brackets 38 and 40, respectively, to which vertically movable hoist cables 42 and 44, respectively, are attached. Raising or lowering the hoist cables effects corresponding movement of grill 22.

Grill 22 further comprises a horizontally disposed, cylindrical fork pivot shaft 46 which extends through holes 48, 50 and 52 in the vertical members 28, 32 and 30, respectively. One end of shaft 46 is secured, as by welding, to a small plate 54 which is attached by bolts 56 to the exterior of right end member 28. Removal of bolts 56 permits shaft 46 to be withdrawn from grill 22 or, conversely, inserted in the grill during manufacture.

As FIGS. 1 and 2 show, a pair of spaced apart, generally L-shaped rigid forks or tines 60 and 62 are pivotably mounted on shaft 46. Each fork 60, 62 comprises a fork shank 64 having a shaft hole 66 at one end thereof for accommodating shaft 46 and an outwardly projecting fork tine 68 at its other end, generally at a right angle thereto. It is to be understood that each fork 60, 62 is slidably adjustable horizontally on shaft 46 to a desired position, depending on the desired spacing between the forks. In normal use, the forks 60, 62 are spaced apart an appropriate distance and both are disposed in the in-use position shown in FIGS. 1 and 2 wherein the shanks 64 depend vertically and the tines 68 project horizontally to the front of truck 10. FIG. 1 shows fork 60 in the in-use position and shows fork 62 upwardly pivoted in excess of 90° to its stored position wherein tine 68 projects upwardly and rearwardly with its tip disposed out of the way alongside and behind mast 20. It is to be understood that fork 60 is also movable to such a stored position.

Means are provided to lock each fork 60, 62 in stored position. As FIGS. 1 and 2 show, such means comprise a right side fork locking device 70 for right side fork 60 and a left side fork locking device 72 for left side fork 62. Since the locking devices 70 and 72 are identical as regards components, configuration and method of use, although reversely disposed, only right hand locking device 70 is hereinafter described in detail.

Figure 4:
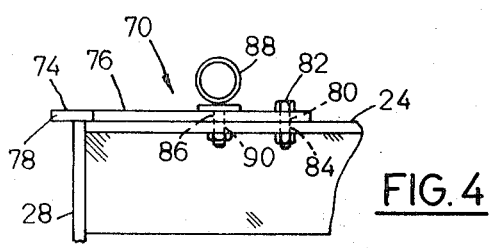
FIG. 4 is an enlarged front elevational view of the fork locking bracket at the right side of the truck showing it in stored position.
Figure 7:
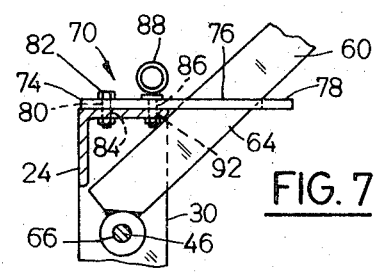
FIG. 7 is a cross-section view taken on line 7-7 of FIG. 6.
Figure 5:
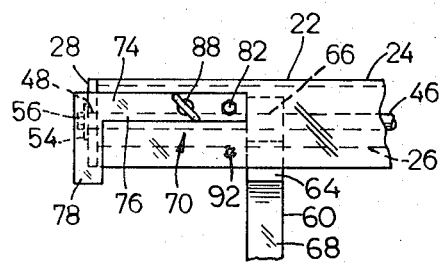
FIG. 5 is a top plan view of the locking device showing the fork locking bracket in stored position.
Figure 6:
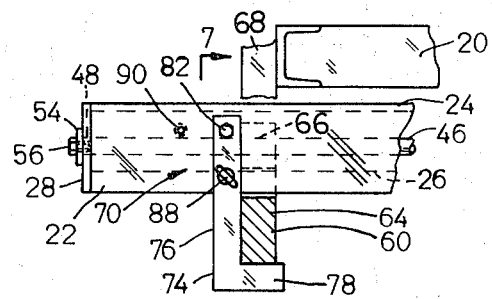
FIG. 6 is a view similar to FIG. 5 but showing the fork locking bracket in locking position.

As FIGS. 1 through 7 show, the right side locking means or device 70 for fork 60 comprises a generally L-shaped rigid bracket 74 having a shank portion 76 and an end portion 78. Shank portion 76 is provided near one end with a first hole 80 for accomodating a bolt 82 which extends through a hole 84 in top bracing member 24 and pivotably secures bracket 74 to the top surface of bracing member 24. Shank portion 76 is also provided outwardly of first hole 80 with a second or pin receiving hole 86 for accommodating a removable latching pin means 88 which, preferably, is in the form of an eye-bolt to facilitate its insertion and removal. When bracket 74 is in its stored position, as shown in FIGS. 4 and 5, pin hole 86 is aligned or in registry with a first pin receiving hole 90 provided in and extending through top bracing member 24 and insertion of pin 88 maintains or locks it in this position. When bracket 74 is swung or pivoted horizontally from its stored position to its tine locking position, as shown in FIGS. 6 and 7, pin hole 86 is aligned or in registry with a second pin receiving hole 92 provided in and extending through top bracing member 24 and insertion of pin 88 maintains, latches or locks it in this position.

Comparison of FIGS. 5 and 6 shows that bracket 74 is swingable or pivotable 90° horizontally between its stored and locking positions. As FIGS. 5 and 7 show, bracket 74 is swung and pinned in locking position after fork 60 has been swung upwardly into stored position wherein the front face of its shank 64 abuts or rests against the front edge of top bracing member 24. It is to be understood that fork 62 is movable to and lockable in stored position in the same manner as fork 60 and that, normally, both forks would be stored or unstored concurrently.

When each fork 60, 62 is swung upwardly to its stored position, the inner side of its tine 68 is adjacent and bears against the side of mast 20, as FIG. 6 shows, and is held in this position by its associated locking device 70, 72. In other words, each stored fork is trapped against lateral displacement on shaft 46 between a side of mast 20 and the shank portion 76 of its associated bracket 74, when the latter is in tine locking position. Thus, there is no danger of a fork 60, 62 sliding lateral on shaft 46 while the forks are in locked position and truck 10 is being transported or moved.

Figure 8:
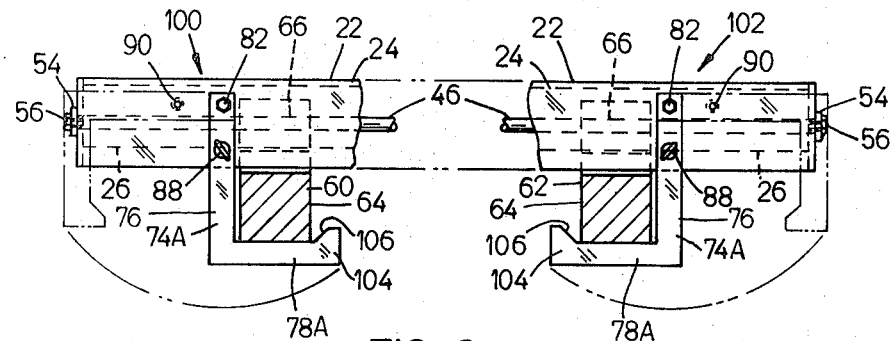
FIG. 8 is a top plan view of another embodiment of locking brackets in accordance with the present invention.

FIG. 8 is a top plan view of another embodiment of right and left side locking means or devices 100 and 102 for forks 60 and 62, respectively. The locking devices 100 and 102 each comprise a generally L-shaped rigid bracket 74A similar to bracket 74 hereinbefore described. However, the end portion 78A of each bracket 74A is provided at its free end with a projection 104 for engagement with the inner side of the shank 64 of its associated fork 60, 62. When forks 60, 62 are in stored position and the brackets 74A are swung into locking position, each fork shank 64 is entrapped against lateral movement between the bracket shank portion 76 and the projection 104 of its associated bracket. To facilitate engagement and disengagement of a bracket 74A with its associated fork 60, 62, the bracket is swung between stored and locked position, the inner side 106 of projection 104 is sloped or cut away to provide clearance for projection 104 to move past the front inside corner of the fork.

The brackets 74A are provided with locking pins 88 and are maintainable in stored or locked position as the brackets 74, as hereinbefore described.

In one embodiment of the invention disclosed herein, the forks when in stored position are shown as being disposed adjacent the example, to a lift truck having a mast construction which is such as to permit the forks to be swung to a stored position on the inner sides of vertical members on the mast. In which case, the locking means would be disposed so as to effect entrapment of the forks between the locking brackets and the inner sides of the mast.

I claim:

1. In a forklift truck: a fork pivot shaft, at least one fork mounted on said fork pivot shaft and having a shank and a tine, said shank being pivotally connected to said fork pivot shaft and said fork being swingably movable in a generally vertical direction with respect to said truck between in-use and stored positions, said fork tine projecting outwardly of said truck when said fork is in its in-use position, said fork tine projecting inwardly of said truck when said fork is in its stored position, and locking means on said truck cooperating with said shank of said fork when said fork is in stored position to maintain said fork in stored position, said locking means comprising a locking member mounted on said truck, said locking member being movable between a stored position clear of said shank of said fork and a locking position in engagement with said shank of said fork, said locking means further comprising releasable latching means for maintaining said locking member in stored or locking positions.

2. A forklift truck according to claim 1 including a pair of said forks and wherein said locking means comprises a pair of said locking members, one for each fork, and a pair of said latching means, one for each locking member.

3. In a forklift truck: at least one fork mounted on said truck and having a tine, said fork being adjustably movable in a generally horizontal direction with respect to said truck, said fork also being swingably movable in a generally vertical direction with respect to said truck between in-use and stored positions, said fork tine projecting outwardly of said truck when said fork is in its in-use position, said fork tine projecting inwardly of said truck when said fork is in its stored position, and locking means on said truck cooperating with said fork when the latter is in stored position to maintain said fork in stored position and to prevent horizontal movement of said fork.

4. A forklift truck according to claim 3 wherein said locking means comprises a locking member mounted on said truck, said locking member being movable between a stored position clear of said fork and a locking position in engagement with said fork.

5. A forklift truck according to claim 4 wherein said locking means further includes releasable latching means for maintaining said locking member in stored or locking positions.

6. A forklift truck according to claim 5 including a pair of said forks and wherein said locking means comprises a pair of said locking members, one for each fork, and a pair of said latching means, one for each locking member.

7. A forklift truck according to claim 6 including a fork pivot shaft on which said forks are slidably and swingably mounted.

8. In a forklift truck having an upright mast and grill mounted for generally vertical movement on said mast: a fork pivot shaft mounted on said grill, at least one fork swingably and slidably mounted on said shaft and having a tine, said fork being swingable upwardly from an in-use position wherein said tine projects outwardly from said truck to a stored position wherein said tine extends alongside a side of said mast and locking means comprising a locking member movably mounted on said grill, said locking member being movable between a stored position clear of said fork and a locking position in engagement with said fork when the latter is in stored position to prevent swinging and sliding movement of said fork on said shaft, said locking means further comprising releasable latching means for maintaining said locking member in stored or locking positions.

9. A forklift truck according to claim 8 wherein said locking member when in its locking position cooperates with a portion of said grill to entrap said fork therebetween to prevent swinging movement of said fork on said shaft.

10. A forklift truck according to claim 9 wherein locking member when in its locking position further cooperates with said mast to entrap said fork therebetween to prevent sliding movement of said fork on said shaft.

11. A forklift truck according to claim 9 wherein said locking member comprises a shank portion and a projection spaced therefrom between which said fork is entrapped when said locking member is in its locking position to prevent sliding movement of said fork on said shaft.

12. A forklift truck according to claim 10 wherein said latching means comprises pin means releasably engageable with said locking member and said grill to maintain said locking member in either stored or locking position.

13. A forklift truck according to claim 11 wherein said latching means comprises pin means releasably engageable with said locking member and said grill to maintain said locking member in either stored or locking position.

14. In a forklift truck having an upright mast: a grill mounted for generally vertical movement on said mast, said grill comprising a cross brace member, a fork pivot shaft mounted on said grill below said cross brace member, a pair of forks swingably and slidably mounted on said shaft, each fork having a tine, said forks being swingable upwardly from an in-use position wherein their tines project outwardly from said mast to a stored position against said cross brace member wherein said tines extend alongside the sides of said mast, a pair of locking brackets pivotably connected to said cross brace member, each locking bracket being movable between a stored position clear of its associated fork and a locking position in engagement with its associated fork when the latter is in stored position to prevent swinging and sliding movement of the associated fork, each locking bracket having a pin hole therein, and a pair of latching pins, one for each locking bracket, for maintaining said locking brackets in either stored or locking position, each latching pin being releasably engageable with said pin hole in said bracket and said cross brace member.

15. A forklift truck according to claim 14 wherein said cross brace member comprises a pair of spaced apart pin holes therein for each locking bracket, said latching pin being insertable in said pin hole in said bracket and cooperable with either pin hole in said cross brace member for releasably securing said bracket to said cross brace member in either stored or locking position.

* * * * *